G. COWING.
Polishing Metal.
No. 38,565.
2 Sheets—Sheet 1.
Patented May 19, 1863.
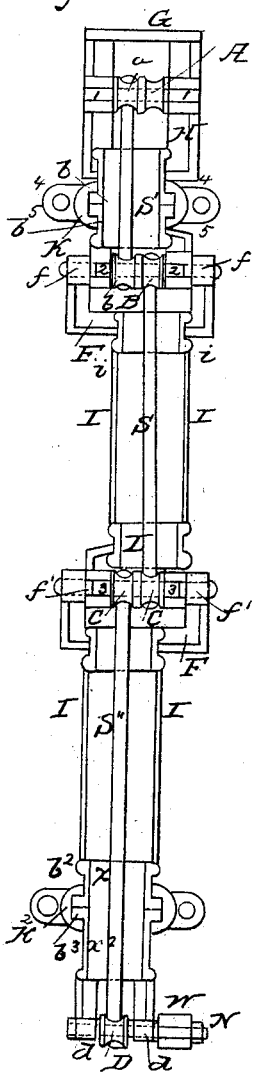
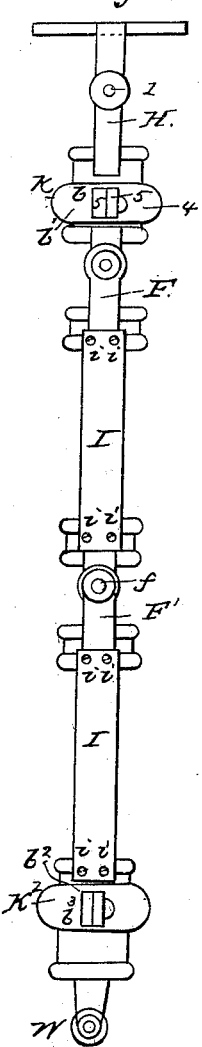
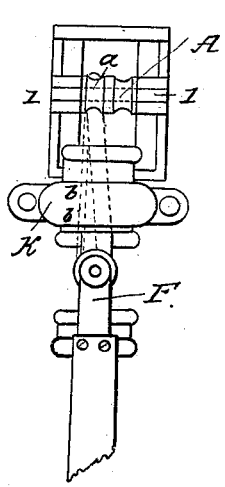
Witnesses
C. A. Parsons
Phil. Cowing
Inventor
George Cowing

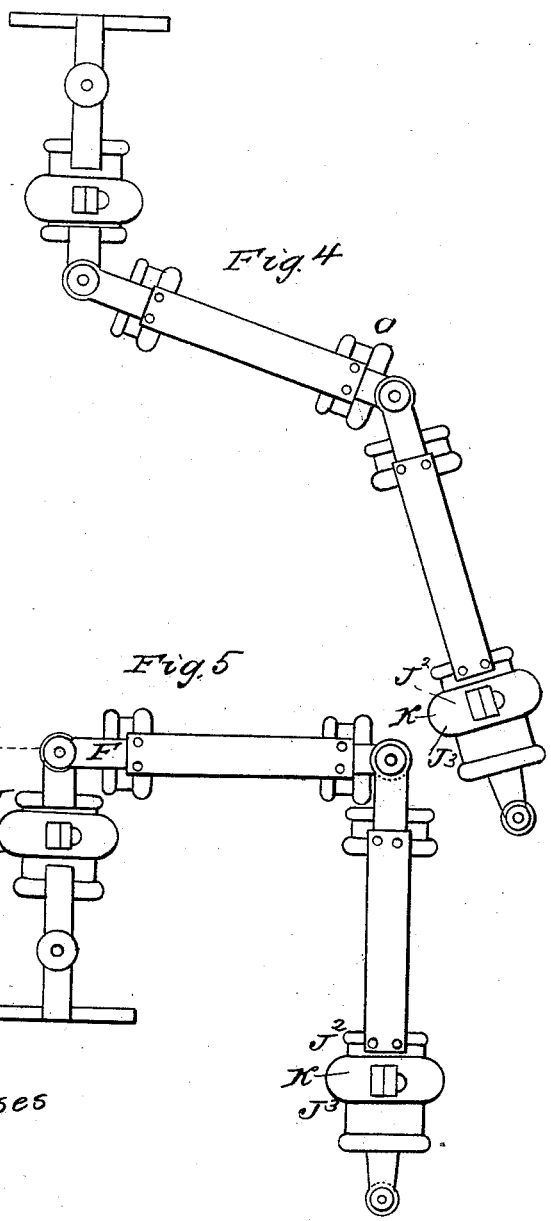

United States Patent Office.

GEORGE COWING, OF SENECA FALLS, NEW YORK.

IMPROVEMENT IN MACHINES FOR FINISHING METALLIC SURFACES.

Specification forming part of Letters Patent No. 38,565, dated May 19, 1863.

*To all whom it may concern:*

Be it known that I, GEORGE COWING, of Seneca Falls, in the county of Seneca and State of New York, have invented a new and useful Machine for Finishing Metallic Surfaces, or other purposes, which I designate a "Universal Finisher;" and I do hereby declare that the following is a full, clear, and exact description of the construction and operation of the same, reference being had to the annexed drawings, making part of this specification, and to the letters of reference marked thereon.

The nature of my invention consists in the combination of a series of pulleys and joints, with or without swivels, in such a manner that motion may be communicated by means of bands running on said pulleys to the extremity of the series, while the joints are bent or swivels turned in any direction to adapt the wheel at the extremity to an irregular surface.

In the drawings herewith appended, Figure 1 represents a section through center of machine; Fig. 2, a side elevation; Fig. 3, a machine turned on swivel so that joints are at right angles; Fig. 4, a side elevation of machine with base fastened to ceiling and joints bent; Fig. 5, a side elevation of machine with base fastened to the floor and joints bent.

Corresponding letters represent the same part in the different drawings.

In Fig. 1, beginning at the upper part of the drawings, which represent the base of the machine, A *a* is a double pulley, firmly fastened upon a single shaft, with bearings 1 1 in frame H. The lower end of the frame H is formed by a cylindrical ring, which permits the passage of a band from the pulley *a* through to the pulley on the next joint and at the same time forms part of a swivel, having for this purpose a projection or flange, J, on its lower edge, corresponding to a similar flange, J', on a similar ring, to which the bearings of the next double pulley and joint are attached. The flanges J J' work smoothly upon each other, being held together by a ring, K, recessed for the purpose and formed of two parts, joined at opposite sides by means of lugs 5 5 and screws 4 4, the whole, so far as described, forming a swivel and joint connecting the first frame, H, with the next frame, F, in such a manner that the frame F, with its pulleys B *b*, connected by a band with the pulley A *a*, may be turned partially around upon the frame H, as represented in Fig. 3, while the machine is in operation and without interfering with the motion of the band. The frame F is formed by a cylindrical ring, similar to that described in frame H, having arms projecting from its sides and reaching upward to the bearings upon similar arms projecting from the swivel above described. These bearings are connected by a shaft, and form a joint, the shafts of joint being in the same line with the shaft of the double pulley B *b*, thus allowing the joint to be bent without altering the distance between the pulleys A *a* and B *b* or interfering with the action of the band while the machine is in operation.

Attached to the frame F are suitable extensions 1 1, which may be made of any length required, reaching to the next cylindrical ring L. The ring L has projections, with bearings similar to those described in frame F, connecting it with similar projections from the next frame F', and forming a joint similar to the one before described with the double pulley C *c*, having its axis on the line of the axis of the joint, as in the joint first described. By this arrangement of the pulleys upon the joints the different sections of the machine may be bent in any direction without altering the tension of the bands. The extensions I' I' connect the last-described joint with another cylindrical ring and swivel, *x*, similar to the one first described. The lower or last ring of the swivel has projections with bearing *d d* for the shaft of the pulley D, which shaft projects through the bearing at one side, forming an arbor upon which the finishing-wheel W is fastened.

When the machine is to be operated, the power is applied to the driving-pulley A, from which the motion is communicated by a band running over the pulley *a* through the cylindrical rings to the pulley *b* in the next joint. B then becomes a driving-pulley for the next joint, and so on to the end of the series.

The base of the machine may be attached either to the ceiling, the wall, or floor of the room, and the joints extended or folded back or the swivels turned round, so that the finishing-wheel may be held at any angle whatever, thus adapting it to any surface, however irregular, without interfering with the motion.

If the machine be made large and heavy, it may be balanced by counter-weights, so as to be easily handled. It may be attached to the side wall of the room and made to fold back like a gas burner, or fastened to the floor, as shown in Fig. 5, with a cord and pulley to sustain it, as at E V. The series of joints may be extended to any number required.

I do not claim a single joint or section, as used in saw-frames having one joint or section, for sawing off lumber, as they have been in use many years. My invention, having a series of joints, is an entirely different machine.

What I claim as my invention, and desire to secure by Letters Patent, is—

The series of joints and pulleys, as described, in combination with a swivel or swivels, substantially as and for the purposes herein set forth.

GEORGE COWING.

Witnesses:
CHARLES A. PARSONS,
MARSHALL COWING.